(12) United States Patent
Yokose

(10) Patent No.: US 6,873,737 B2
(45) Date of Patent: Mar. 29, 2005

(54) IMAGE ENCODING SYSTEM, IMAGE DECODING SYSTEM AND METHODS THEREFOR

(75) Inventor: Taro Yokose, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 619 days.

(21) Appl. No.: 09/800,961

(22) Filed: Mar. 8, 2001

(65) Prior Publication Data

US 2001/0033696 A1 Oct. 25, 2001

(30) Foreign Application Priority Data

Mar. 14, 2000 (JP) ........................................ 2000-070764

(51) Int. Cl.$^7$ ................................................. G06K 9/36
(52) U.S. Cl. .................. 382/238; 348/394.1; 348/411.1
(58) Field of Search ................................ 382/209, 218, 382/232, 233, 238, 239; 341/51; 348/394.1, 404.1, 409.1, 411.1; 358/426.02

(56) References Cited

U.S. PATENT DOCUMENTS

| | | | | |
|---|---|---|---|---|
| 4,144,547 A | * | 3/1979 | Stoffel | 382/238 |
| 4,215,374 A | * | 7/1980 | Mizuno | 382/238 |
| 4,633,325 A | * | 12/1986 | Usubuchi | 382/238 |
| 5,134,478 A | * | 7/1992 | Golin | 375/240.12 |
| 5,991,449 A | * | 11/1999 | Kimura et al. | 382/238 |
| 6,028,963 A | * | 2/2000 | Kajiwara | 382/239 |

FOREIGN PATENT DOCUMENTS

JP          9-224253          8/1997

OTHER PUBLICATIONS

Takagi and Shimoda, "Handbook Of Image Analysis", University of Tokyo Press, 1991, pp. 497–498.

* cited by examiner

Primary Examiner—Daniel Mariam
(74) Attorney, Agent, or Firm—Morgan Lewis & Bockius LLP

(57) ABSTRACT

A system and method are provided for realizing high speed and high efficiency in compression of image data having periodicity. The present invention includes the following: an image input unit to input image signal; a first predictive converter which converts relation between the pixel value of a target pixel in the image signal inputted through the image input part and that of another pixel into a first prediction value; a first encoder which generates intermediate data by encoding the first prediction value output from the first predictive converter; a second predictive converter which converts relation between a target symbol among symbols making up the intermediate data generated by the first encoder and another symbol into a second prediction value; and a second encoder which generates an encoded signal by encoding the second prediction value output from the second predictive converter.

19 Claims, 16 Drawing Sheets

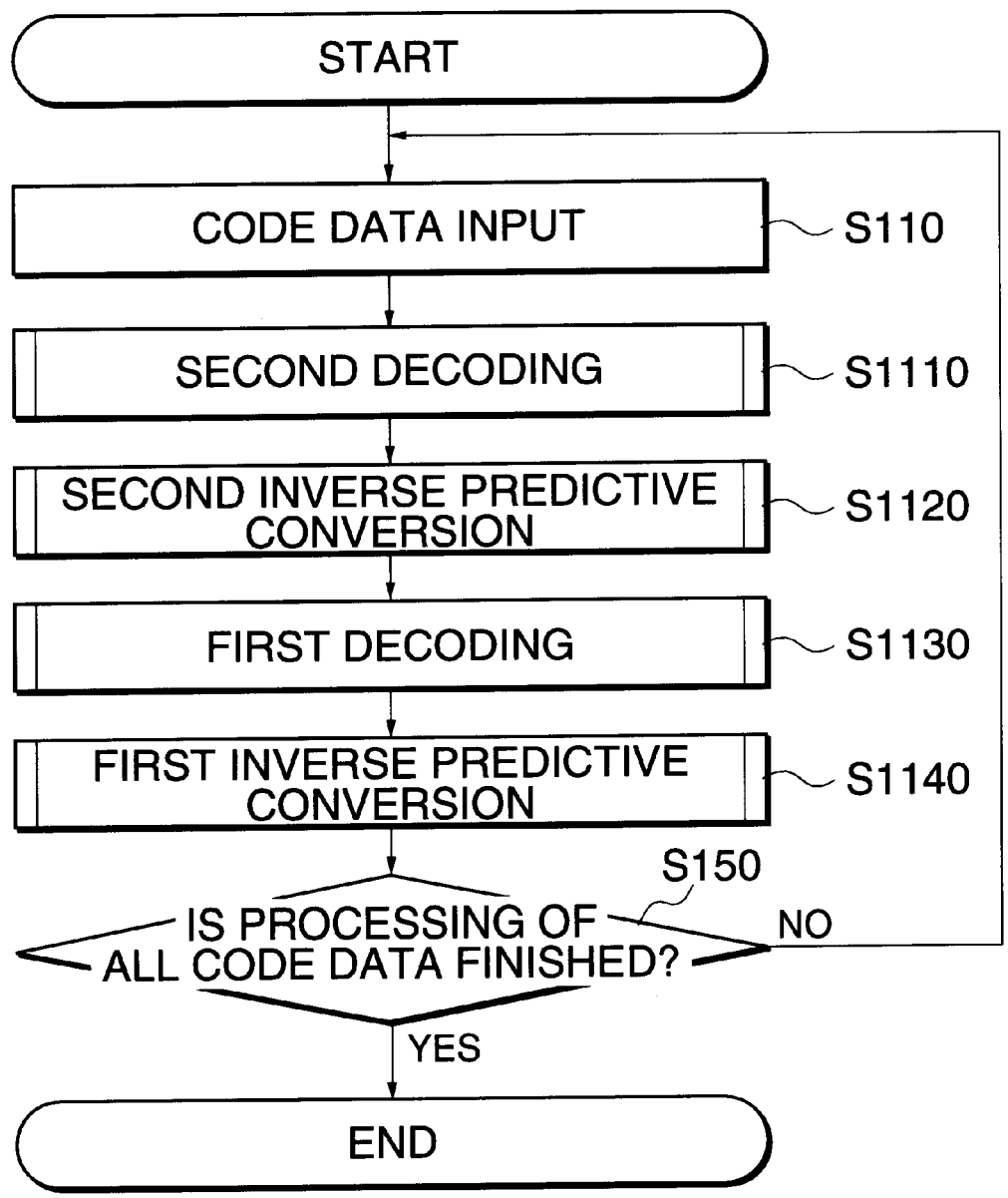

FIG.5A

S100: PIXEL VALUE 10 | PIXEL VALUE 10 | PIXEL VALUE 20 | PIXEL VALUE 20 | PIXEL VALUE 20 | PIXEL VALUE 30 | ......

FIG.5B

S130: MATCH | MATCH | ERROR 10 | MATCH | MATCH | ERROR 10 | ......

FIG.5C

S131: ERROR 10 RUN 1 | MATCH RUN 2 | ERROR 10 RUN 1 | MATCH RUN 2 | ERROR 10 RUN 1 | ......

FIG.5D

S131-2: ERROR 10 RUN 1 | MATCH RUN 2 | 2 BEFORE | 2 BEFORE | 2 BEFORE | ......

FIG.5E

S132: ERROR 10 RUN 1 | MATCH RUN 2 | 2 BEFORE RUN 3 | ......

FIG.6A

| ABOVE MATCH RUN 1 | ERROR 255 RUN 1 | ABOVE MATCH RUN 2 | LEFT MATCH RUN 1 | ERROR 255 RUN 1 | ABOVE MATCH RUN 2 | LEFT MATCH RUN 1 | ERROR 255 RUN 1 | LEFT MATCH RUN 1 | ABOVE MATCH RUN 1 |

FIG.6B

| ABOVE MATCH RUN 1 | ERROR 255 RUN 1 | LEFT MATCH RUN 1 | ABOVE MATCH RUN 2 | 3 BEFORE RUN 5 | ABOVE MATCH RUN 1 |

| HIGHER-LEVEL SYMBOL DATA 132 | | Huffman CODE |
|---|---|---|
| PREDICTION SYMBOL | FIRST PREDICTOR | 0 |
| | SECOND PREDICTOR | 10 |
| | PREDICTION ERROR | 110 |
| HIGHER-LEVEL SYMBOL | THIRD PREDICTOR | 1110 |
| | FOURTH PREDICTOR | 1111 |

FIG.12B

| HIGHER-LEVEL SYMBOL DATA 132 | Huffman CODE |
|---|---|
| RUN LENGTH=1 | 0 |
| 2 | 10 |
| 3 | 110 |
| ... | ... |
| n | 111...1 |

FIG.12C

| HIGHER-LEVEL SYMBOL DATA 132 | Huffman CODE |
|---|---|
| ERROR=255 | 1111111111 |
| -254 | 1111111110 |
| -253 | 1111111101 |
| ... | ... |
| 255 | 0111111111 |

| L | L | L | L | L | L | L | L | L | L | L | L |
|---|---|---|---|---|---|---|---|---|---|---|---|
| A | E | L | A | A | E | L | A | A | E | L | A |
| E | A | A | A | E | A | A | A | E | A | A | A |
| L | L | L | L | L | L | L | L | L | L | L | L |

A=ABOVE, E=ERROR, L=LEFT

IMAGE ENCODING SYSTEM, IMAGE DECODING SYSTEM AND METHODS THEREFOR

BACKGROUND OF THE INVENTION

1. Field of the Invention

This invention relates to technology of image data compression, particularly to an image encoding system which performs compression encoding of multivalued input image data and an image decoding system which converts compressed encoded data back into its original form, and an image encoding method and an image decoding method.

2. Description of Related Art

Generally volumes of image data are so huge that it is often compressed to reduce its volume for communications or storage. Image encoding methods are broadly classified into two types: a reversible type and an irreversible type. In irreversible encoding methods, visual deterioration in the quality of decoded images may occur depending on the compression rate.

On the other hand, if a reversible encoding method, in which encoded data is converted into its original form to produce the same image as an input image, is used, the problem of image quality deterioration can be prevented. A technique specially designed for CG (computer graphics) images as disclosed in Japanese Published Unexamined Patent Application No. Hei 9-224253 will be explained next as a typical reversible encoding method based on the related art.

This related art example takes advantage of the characteristic of CG images that they are highly predictable when prediction is based on peripheral pixels; encoding is done on one among multiple predictors that has made the right prediction. FIGS. 14 and 15 show an example of a conventional image encoding system and of a conventional image decoding system, respectively. In these figures, 10 represents an image input unit, 20 a first predictor, 21 a second predictor, 30 a prediction error calculator, 31 a prediction error adder, 40 and 41 first selectors, 50 a second encoder, 51 a second decoder, 60 a code output unit, 70 a code input unit, 80 an image output unit, 100 image data, 110 prediction data, 111 control data, 120 prediction error data, 130 prediction condition data, 140 code data, 1010 a first predictive converter and 1020 a first predictive inverse converter.

First, the elements of the image encoding system shown in FIG. 14 are explained. The system is configured and designed to work as follows: first the image input unit 10 receives input image data from outside and sends it to the first predictor 20, the second predictor 211 and the prediction error calculator 30.

The first predictor 20 and the second predictor 21 predict the pixel value of a target pixel according to image data 100 in a given manner and sends the prediction data 110 to the first selector 40.

The prediction error calculator 30 predicts the pixel value of a target pixel in a given manner from the image data 100 and subtracts the predicted value from the real pixel value of the target pixel to send the resulting value (difference) as prediction error data 120 to the first selector 40.

The first selector 40 uses the image data 100 and the prediction data 110 to detect whether the prediction for the target pixel is right or wrong. As a result, if the prediction made by either predictor is right, the predictor's ID number is sent to the second encoder 50; if neither predictor has made the right prediction, the prediction error data 120 is converted into prediction condition data 130 and sent to the second encoder 50.

The second encoder 50 encodes the prediction condition data 130 using a given encoding technique and sends the resulting data as code data 140 to the code output unit 60. The code output unit 60 outputs the code data 140 as output code to outside.

Next, the elements of the image decoding system as shown in FIG. 15 are explained. The elements which are the same as the ones used in the image encoding system as shown in FIG. 14 are marked with the same reference numerals and their descriptions are omitted here. The code input unit 70 receives input code data from outside and sends it as code data 140 to the second decoder 51.

The second decoder 51 decodes the code data 140 using a decoding technique to match the encoding technique used in the second encoder 50 and sends the decoded data as prediction condition data 130 to the first selector 41.

If the prediction condition data 130 indicates a predictor ID number, the first selector 41 sends control data 111 to the predictor corresponding to the ID number, from which image data 100 is outputted. On the other hand, if the prediction condition data 130 indicates a prediction error, the first selector sends it as prediction error data 120 to the prediction error adder 31.

The prediction error adder 31 predicts the pixel value of the target pixel in the same way as the prediction error calculator 30, adds the prediction error data 120 to the predicted value and sends the resulting data as image data 100 to the image output unit 80. The image output unit 80 outputs the image data 100 as output image data to outside.

Next given is a description of operation in a related art example based on the above-mentioned configuration. FIG. 16 is a flowchart showing the operational sequence for a conventional image encoding system, and FIG. 17 is a flowchart showing the operational sequence for a conventional image decoding system.

First, the operational sequence for encoding is explained referring to FIG. 16. At step S10', image data is inputted in the image input unit 10. At step S20', the first predictor 20 and the second predictor 21 predict the pixel value of the target pixel according to the image data 100 and at the same time the prediction error calculator 30 calculates the prediction error for the predicted value in a given manner.

At step S30', the first selector 40 sends either the ID number of the predictor whose prediction is found right or prediction error data, as prediction condition data 130, to the second encoder 50. At step S40', the second encoder 50 performs encoding of the prediction condition data 130 in a given manner. At step S50', the encoded data is outputted. At step S60', if all the image data has been processed, the encoding sequence is ended; if not, the steps from S10' are repeated.

Next, the decoding sequence is explained, referring to FIG. 17. At step S110', code data is inputted in the code input unit 70. At step S120', the second decoder 51 performs the decoding process which is the inverse of the encoding process which has been carried out in the second encoder 50, and generates prediction condition data 130.

At step S130', if the prediction condition data 130 indicates a predictor ID number, the first selector 41 sends control data 111 to a predictor which has that ID number (either the first predictor 20 or the second predictor 21). If the prediction condition data 130 indicates a prediction error, the first selector 41 sends it as prediction error data 120 to the prediction error adder 31.

At step S21', the predictor which has received the control data 111 (either the first predictor 20 or the second predictor 21) performs prediction processing in a given manner or the prediction error adder 31 adds the prediction error data 120 to the predicted value in the same manner as the prediction error calculator 30, to generate image data 100.

At step S140', the image output unit 80 outputs the image data 100 to outside. At step S150', if all the input code data has been processed, the decoding sequence is ended; if not, the steps from S110' are repeated.

In the above-mentioned sequences, predictor selection at step S30' may be made by ranking the predictors beforehand or by updating the ranking of predictors. In addition, predictor identification based on the prediction condition data 130 may be expressed by this ranking. Also, the second encoder 50 may use run length code data for the ID number of the first predictor 20.

However, the related art has the following problems. According to the related art, it is desirable for the predictors 20 and 21 to use pixels similar to the target pixel, because due to the nature of images, pixels of an identical pixel value have a tendency to concentrate spatially or come close to each other. This nature is provisionally called image locality.

There is a type of images with periodicity, called "halftone images." "Halftone images" here refer to images which have multivalued tones as expressed in binary form or by limited tones because of the limitations of the image reproduction technique. The term "periodicity" used here is explained next.

For instance, since printing presses or inkjet printers can only represent two values by presence and absence of ink, to reproduce images, they use a publicly known technique for multivalue-binary conversion such as a systematic dither method described in Takagi and Shimoda, "HANDBOOK OF IMAGE ANALYSES", UNIVERSITY OF TOKYO PRESS, pp. 497–498, 1991. Images produced in this way are halftone images as defined here.

In the systematic dither method, an input image is divided into partial images and the pixel value of each partial image is compared with the threshold predetermined for the coordinates of each partial image and classified into either black or white depending on whether it is larger or smaller than the threshold. Hereinafter, such partial images are called dither patterns.

In binarized image data as mentioned above, if there is a succession of equal or similar pixel values, a black and white pattern whose size is the same as a dither pattern is generated. Usually, a dither pattern uses a 4-by-4 or 8-by-8 matrix, so resulting binarized images have periodicity over multiple pixels.

FIGS. 18A and 18B show examples of a multivalued image with a uniform pixel value processed using a spiral 4-by-4 systematic dither. FIG. 18A represents a multivalued image and FIG. 18B represents a binary image produced by dithering. These phenomena often appear as a result of binarization of multivalued images or tone-limited conversion; they are not unique to systematic dither methods.

Images with periodicity as illustrated here are difficult to encode efficiently by a conventional method based on the related art. The reason is that many pixels which are unpredictable from pixels adjacent to the target pixel are generated.

The above-mentioned difficulty is illustrated next. FIG. 19 shows prediction condition data 130 which is generated when the examples of FIGS. 18A and 18B are processed according to the related art. Although prediction condition data 130 actually takes the form of a data stream, it is represented here two-dimensionally for a better understanding.

Also, it is assumed here that in the related art, the first predictor 20 serves as a "left" predictor which references a pixel just on the left of the target pixel and the second predictor 21 serves as an "above" predictor which references a pixel just above the target pixel. In the figures, "L" (left) or "A" (above) indicates a pixel which can be predicted by the "left" predictor or the "above" predictor. "E" (error) represents a pixel which cannot be predicted by either predictor.

If in the conventional method, the second encoder 50 incorporates a part which runs length encoding, there are successions of equal prediction condition data 130 in the first and the fourth line so the data can be compressed efficiently. On the other hand, data in the second and the third line have a cyclic pattern, but its compressibility is low in the conventional method.

One method to prevent such a decrease in compressibility is to add as a new predictor the fourth pixel before the target pixel. However, this method has the following problems.

1. Only a dither which corresponds to the predictor position can be used.

2. Since the number of predictors increases, the volume of prediction condition data 130 also increases and thus the compressibility decreases.

3. The increase in the number of predictors makes prediction processing more complicated and thus decreases the processing speed.

As discussed so far, the major problem of the related art is that it is impossible to compress an image with periodicity efficiently because pixels adjacent to the target pixel are mainly used for prediction processing. Furthermore, in order to prevent this, many predictors must be added, which also contributes to the problem of efficiency reduction.

SUMMARY OF THE INVENTION

The present invention has been made in view of the above circumstances and provides an image encoding system which converts images, particularly images with high periodicity into image code data with high compressibility, and also an image decoding system which decodes the data thus encoded.

According to an aspect of the present invention, the image encoding system has the following: an image input part to input an image signal; a first predictive converter which converts relation between the pixel value of a target pixel in the image signal inputted through the image input part and that of another pixel into a first prediction value; a first encoder which generates intermediate data by encoding the first prediction value output from the first predictive converter; a second predictive converter which converts relation between a target symbol among symbols making up the intermediate data generated by the first encoder and another symbol into a second prediction value; and a second encoder which generates an encoded signal by encoding the second prediction value output from the second predictive converter.

According to another aspect of the present invention, the image encoding method includes the following steps of: inputting an image signal; converting relation between the pixel value of a target pixel in the image signal and that of another pixel into a first prediction value; encoding the first prediction value to generate intermediate data; converting relation between a target symbol among symbols making up the intermediate data and another symbol into a second prediction value; and encoding the second prediction value to generate an encoded signal.

Thus, the present invention makes it possible to encode an image signal according to its locality by converting it into a first prediction value, and also to eliminate redundancy caused by periodicity of intermediate data by converting the intermediate data generated by encoding the first prediction into a second prediction value.

According to another aspect of the present invention, the image decoding system has the following: a code input part which inputs an encoded signal; a second decoder which decodes the encoded signal inputted from the code input part to generate a second prediction value; a second inverse predictive converter which inversely converts the second prediction value generated by the second decoder to generate intermediate data; a first decoder which decodes the intermediate data generated by the second inverse predictive converter to generate a first prediction value; and a first inverse predictive converter which inversely converts the first prediction value decoded by the first decoder to generate a pixel value of a target pixel.

According to another aspect of the present invention, the image decoding method includes the following steps of: inputting an encoded signal; decoding the encoded signal to generate a second prediction value; inversely converting the second prediction value to generate intermediate data; decoding the intermediate data to generate a first prediction value; and inversely converting the first prediction value to generate a pixel value of a target pixel.

Thus, the present invention decodes an encoded signal to generate a second prediction value, and converts the second prediction value inversely. This generates intermediate data with periodicity. In addition, this intermediate data is decoded to generate a first prediction value, which is then converted inversely. This makes it possible to obtain an image signal which reproduces image locality.

BRIEF DESCRIPTION OF THE DRAWINGS

Preferred embodiments of the present invention will be described in detail based on the followings, wherein:

FIG. 4 is a flowchart showing an example of the operational sequence in an image decoding system according to the first embodiment of the present invention;

FIGS. 5A through 5E show diagrams illustrating the data conception in an image encoding/decoding system according to the first embodiment of the present invention;

FIGS. 6A and 6B show comparison in data conception between an image encoding/decoding system according to the first embodiment of the present invention and a system according to the related art;

FIGS. 12A through 12C show examples of Huffman code data;

FIG. 19 illustrates the conception of prediction condition data 130 in the related art.

DETAILED DESCRIPTIONS OF THE PREFERRED EMBODIMENTS

Preferred embodiments of the present invention will be explained next. First of all, the basic principle of the invention is described. As can be understood from FIG. 19, prediction condition data 130 also has periodicity as input image data does. This periodicity will not be lost even if run length coding takes place in the image encoder 50. In the data subjected to run length coding, the cycle becomes shorter because successions of equal prediction condition data 130 are grouped on a run basis. Here, prediction condition data 130 grouped by run length coding is called "prediction symbol."

A pattern in the input image which covers multiple pixels is converted into a very short cycle in the prediction symbol. Therefore, according to this invention, prediction symbol is subjected to prediction processing again.

The prediction symbol cycle depends on the type of prediction condition data 130 included in one pattern, which means that it does not depend on the dither pattern size in the input image. The reason is that even as the dither pattern size increases, the number of types of prediction condition data 130 does not increase. In addition, since the cycle of the pattern in the prediction symbol is short, even a limited number of predictors can take in cycles satisfactorily. As a consequence, the problem of reduced efficiency caused by an increase in the number of predictors as seen in the related art can be prevented.

According to the present invention, prediction symbols are subjected to processing for higher-level prediction and the resulting symbols are called "higher-level symbols."

Figure 1:
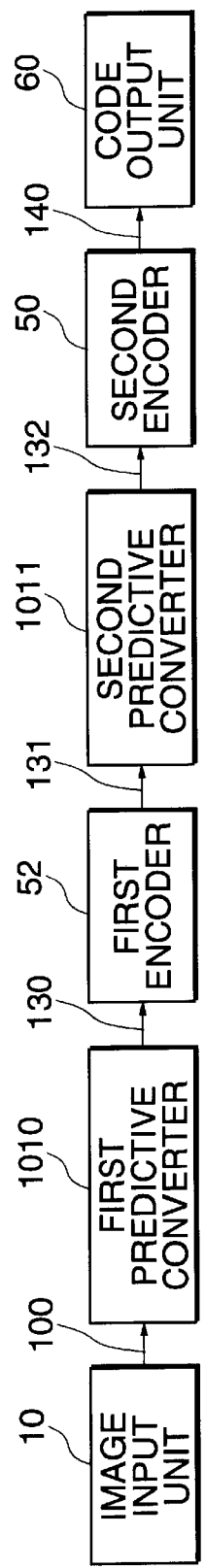
FIG. 1 shows the configuration of an image encoding system according to a first embodiment of the present invention.
Figure 2:
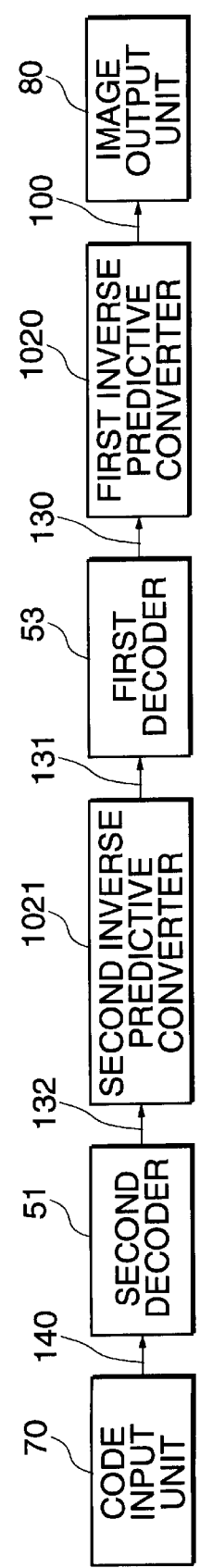
FIG. 2 shows the configuration of an image decoding system according to the first embodiment of the present invention.
Figure 14:
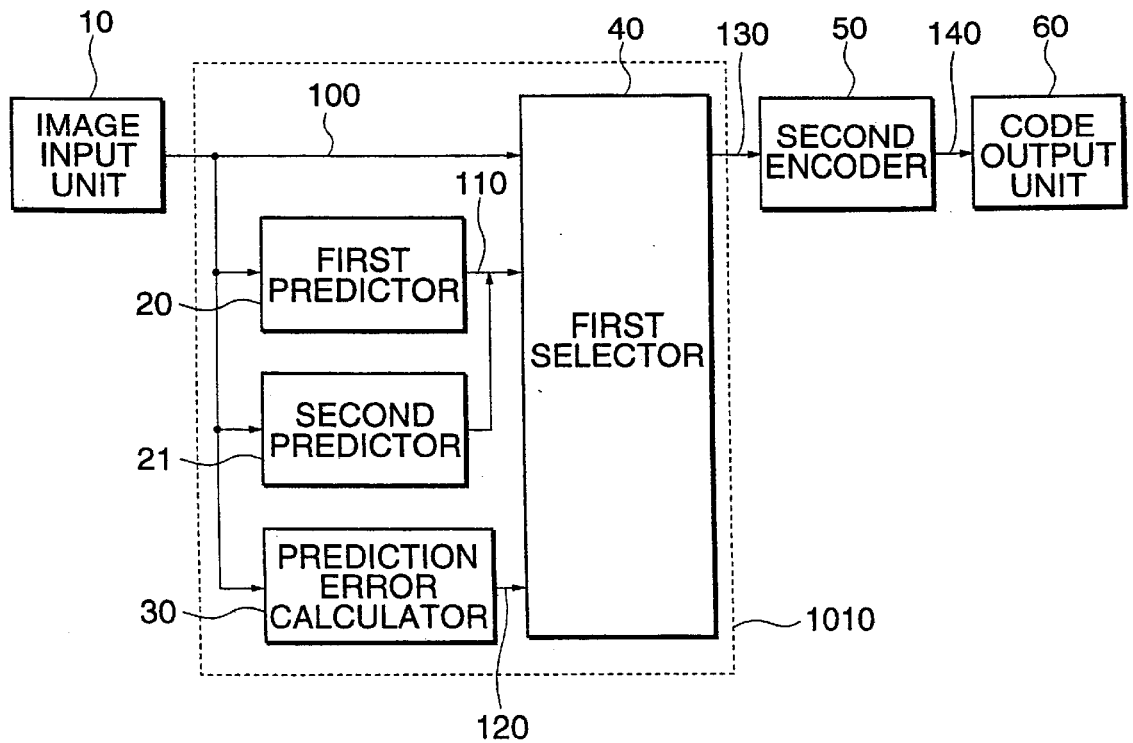
FIG. 14 shows the configuration of an image encoding system according to the related art.
Figure 15:
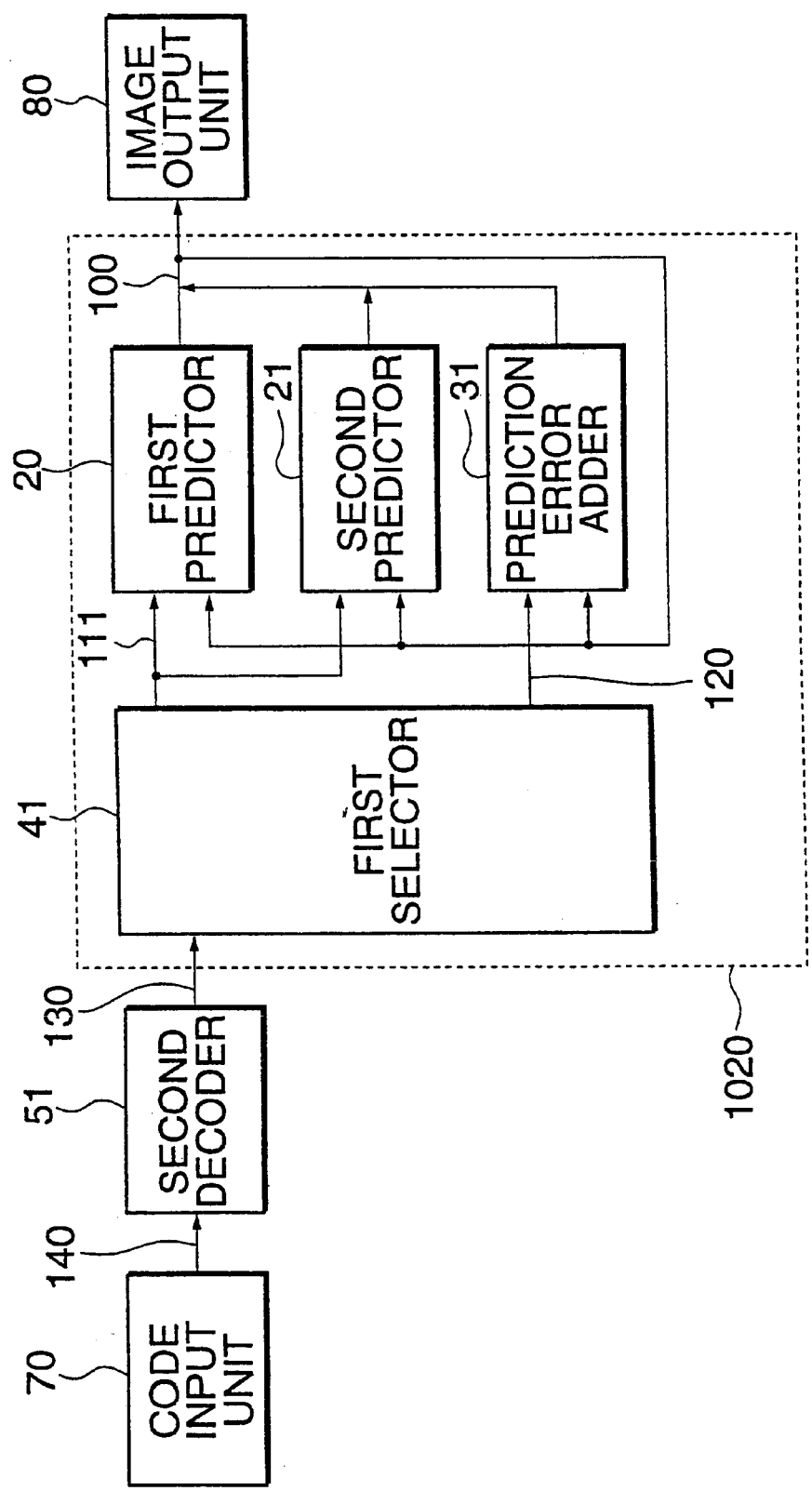
FIG. 15 shows the configuration of an image decoding system according to the related art.
Figure 16:
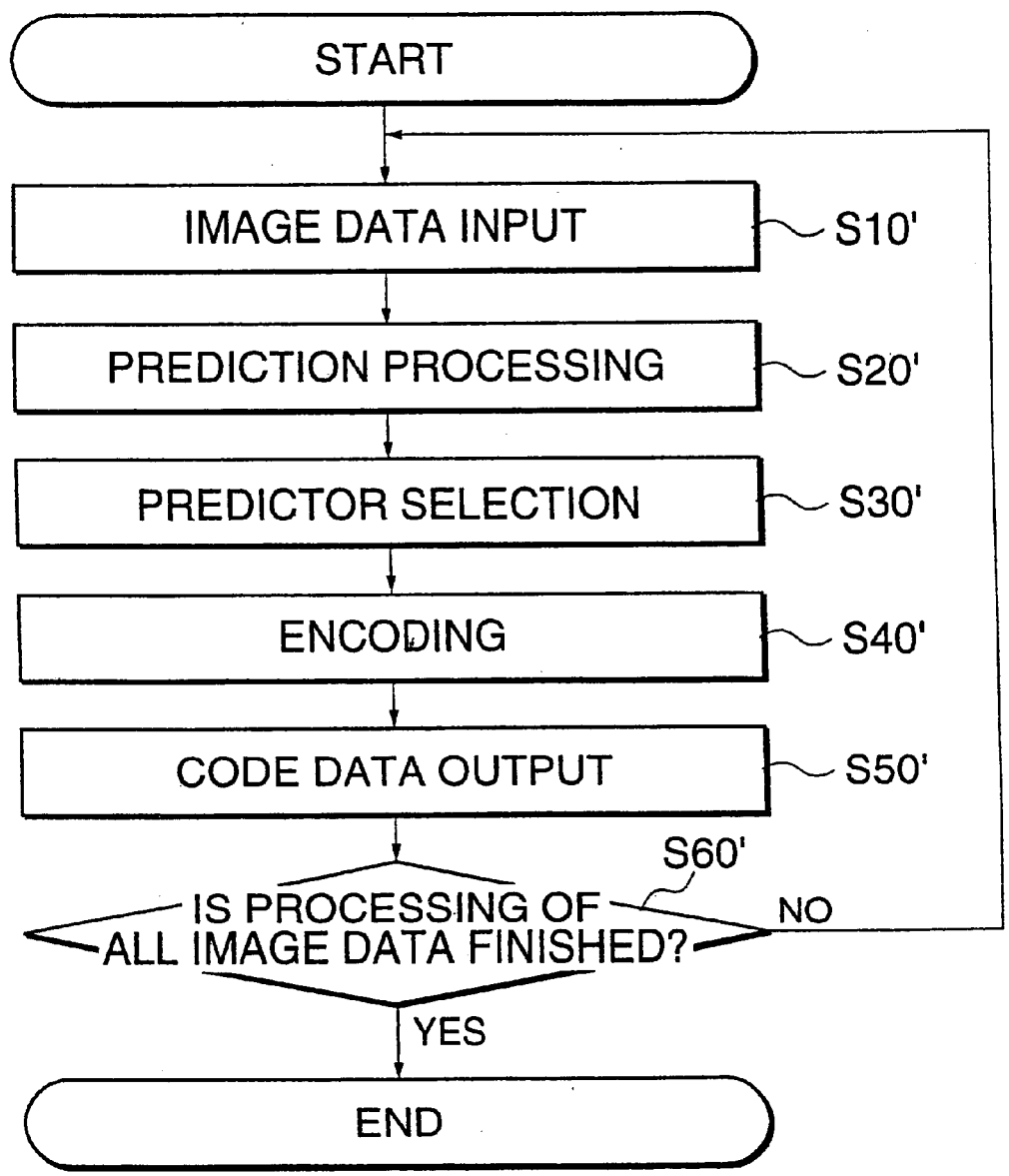
FIG. 16 is a flowchart showing an example of an operational sequence in an image encoding system according to the related art.
Figure 17:
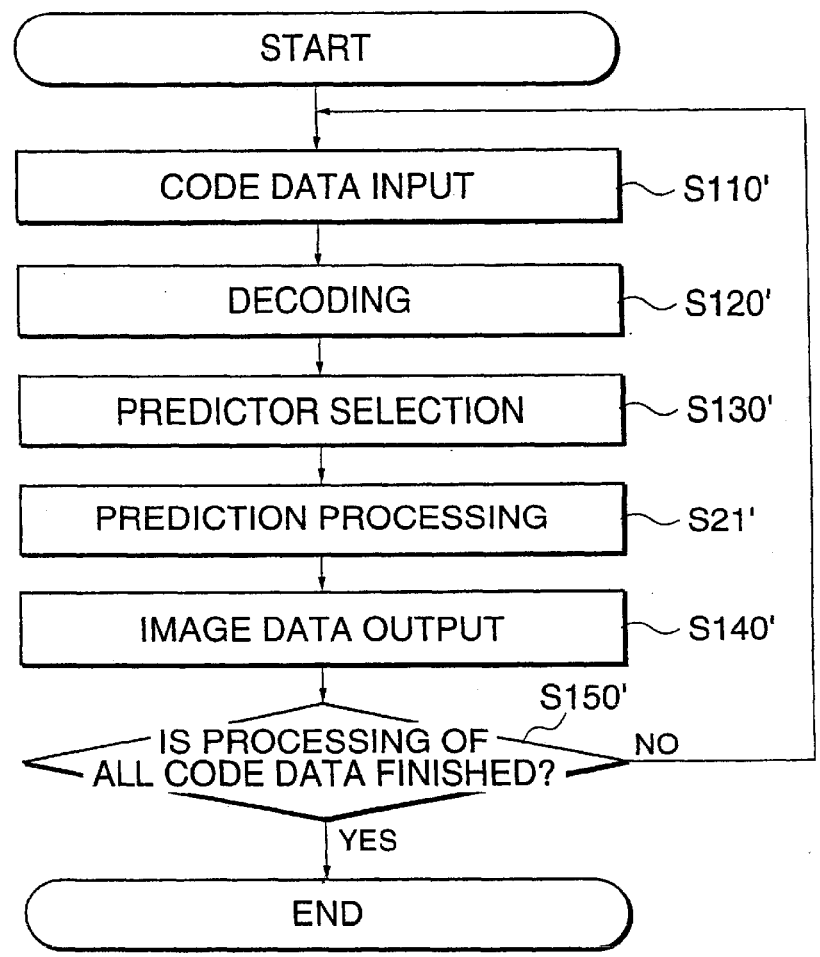
FIG. 17 is a flowchart showing an example of an operational sequence in an image decoding system according to the related art.

The first embodiment of the present invention is explained next. FIGS. 1 and 2 are block diagrams representing an image encoding system and an image decoding system in the first embodiment, respectively. In these figures, the same reference numerals as used in FIGS. 14 and 15 designate the same elements, so only elements other than those elements are described here. 52 denotes a first encoder, 53 a first decoder, 131 prediction symbol data, 132 higher-level symbol data, 1011 a second predictive converter and 1021 a second inverse predictive converter.

As shown in FIG. 1, the first predictive converter 1010 receives image data 100 from the image input unit 10 to convert it in a given manner for prediction and sends the resulting data as prediction condition data (first prediction value) 130 to the first encoder 52.

The first encoder 52 encodes the prediction condition data 130 using a prescribed encoding technique and sends the encoded data as prediction symbol data (intermediate data) 131 to the second predictive converter 1011.

The second predictive converter 1011 converts the prediction symbol data 131 in a given manner and sends the resulting data as higher-level symbol data (second prediction value) 132 to the second encoder 50. The second encoder 50 encodes the higher-level symbol data 132 using a prescribed encoding technique and sends the resulting data as code data 140 to the code output unit 60.

Next, the sequence shown in FIG. 2 is detailed. The second decoder 51 decodes the code data 140 using a decoding technique to match the encoding technique used in the second encoder 50 and sends the resulting data as higher-level symbol data 132 to the second inverse predictive converter 1021.

The second inverse predictive converter 1021 converts the higher-level symbol data 132 using an inverse predictive conversion technique which is the inverse of the predictive conversion technique used in the second predictive converter 1011, and sends the resulting data as prediction symbol data 131 to the first decoder 53.

The first decoder 53 decodes the prediction symbol data 131 using a decoding technique to match the encoding technique used in the first encoder 52 and sends the resulting data as prediction condition data 130 to the first inverse predictive converter 1020.

The first inverse predictive converter 1020 converts the prediction condition data 130 using an inverse predictive conversion technique which is the inverse of the predictive conversion technique used in the first predictive converter 1010 and sends the resulting data as image data 100 to the image output unit 80.

Figure 3:
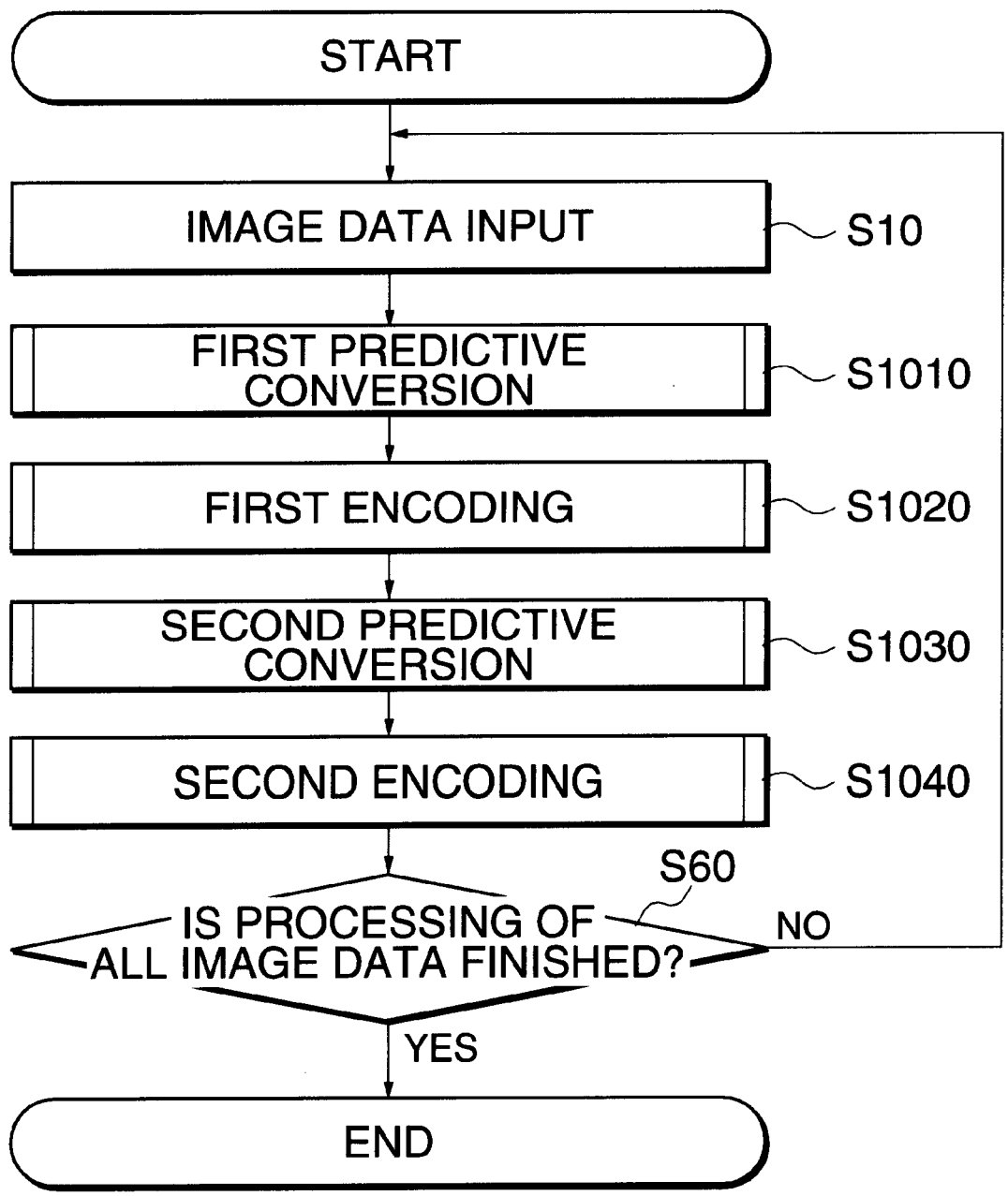
FIG. 3 is a flowchart showing an example of the operational sequence in an image encoding system according to the first embodiment of the present invention.

Based on the above-mentioned configuration, an explanation of the operational sequence in the first embodiment is made next. FIGS. 3 and 4 are a flowchart for the encoding sequence and one for the decoding sequence according to the first embodiment, respectively.

Referring to FIG. 3, the encoding steps in the first embodiment are described next. At step S10, image data is inputted in the image input unit 10. At step S1010, the first predictive conversion takes place in the first predictive converter 1010. At step S1020, the first encoding process is taken in the first encoder 52. At step S1030, the second predictive conversion is performed in the second predictive converter 1011. At step S1040, the second encoding process is taken in the second encoder 50. At step S60, if processing of all input image data is over, the encoding sequence is ended; if not, the steps from S10 are repeated.

Referring to FIG. 4, the decoding steps in the first embodiment are described next. At step S110, code data is inputted in the code input unit 70. At step S1110, the second decoder 51 performs the second decoding process which is the inverse of the encoding process in the second encoder 50.

At step S1120, the second inverse predictive converter 1021 performs the second inverse predictive conversion which is the inverse of the predictive conversion in the second predictive converter 1011. At step 1130, the first decoding process, the inverse of the encoding process in the first encoder 52, is performed. At step S1140, the first inverse predictive converter 1020 performs the first inverse predictive conversion which is the inverse of the predictive conversion in the first predictive converter 1010. At step S150, if processing of all input code data is over, the decoding sequence is ended; if not, the steps from S110 are repeated.

Among the above-mentioned steps, the first encoding and decoding steps are steps to convert multiple input symbols into fewer output symbols. For efficient input/output processing, it is desirable to use a fixed length coding method. Run length coding is one approach in this direction, but other coding methods such as LZ coding may be used for conversion into fewer symbols.

Also, a process to decrease symbols by quantization may be included in the list of available methods as defined above, though it may not be considered a coding process. However, this is an irreversible coding method. On the other hand, variable-length coding methods such as Huffman coding are not included in the list.

In contrast, any coding method called "entropy coding" can be used for the second encoding and decoding processes. In addition to the above-mentioned coding methods, arithmetic coding and Golomb coding are also available.

The first prediction and inverse prediction processing steps are image prediction steps in which conversion or inverse conversion between image data 100 and one-dimensional prediction condition data 130 takes place. If one prediction technique is selected from one or more candidates, the prediction condition data 130 becomes a prediction error data. If two or more prediction techniques are used, the prediction condition data 130 becomes a combination of prediction technique identification data and prediction error data.

It is preferable that prediction processing here is performed two-dimensionally taking image locality into consideration. One of the simplest methods to do so may be "DPCM," a process in which pixel value data is converted into difference between the target pixel and the one just on the left of it. However, for two-dimensional processing, it is desirable to take the pixel value of a pixel one line above into account.

If an increase in processing load is allowed, it is desirable to use more complicated prediction processing as follows: "(left pixel value)+(above pixel value)−(left above pixel value)" or "((left pixel value)+(above pixel value))/2.

If two or more prediction techniques are used concurrently, it is more desirable to use not only the pixel just on the left of the target pixel but also the one just above it, the one above and on the right of it, or the one above and on the left of it.

The first prediction and inverse prediction may be performed adaptively depending on the statistic nature of the image concerned by varying parameters in the prediction formula. Or, it may be done by changing the prediction formula depending on such condition data as pixel value difference between adjacent pixels.

The second prediction and inverse prediction processing steps are steps to carry out a one-dimensional prediction process on the prediction symbol data 131 to convert prediction symbol data 131 into higher-level symbol data 132 and vice versa.

Since image data is not handled here, prediction is done by referencing one or more symbols before the target symbol. This prediction is not based on the nature of the image, so it is unnecessary to make a calculation using prediction formula as in the first prediction and inverse prediction processing steps.

In addition, if the prediction is wrong, it is not always necessary to calculate prediction error; instead, prediction symbol data may be directly used as higher-level symbol data 132. This means that the prediction symbol data 131 includes prediction symbols only, while the higher-level symbol data 132 includes higher-level symbols and prediction symbols. However, some prediction error data may be included here if it may have a certain correlation depending on the nature of the prediction symbols.

FIGS. 5A through 5E show conceptual diagrams for different types of data according to the first embodiment. FIGS. 5A, 5B, 5C, 5D and 5E represent image data 100, prediction condition data 130, prediction symbol data 131, prediction symbol data II 131-2, and higher-level symbol data 132, respectively. The explanation here assumes that only DPCM as mentioned above is used as a prediction method for the first prediction step, and that the run length coding method is used for the first and second encoding steps.

Image data 100 and prediction condition data 130 each have seven data units. They are compressed by the first encoding step into five data units representing the prediction symbol data 131. The prediction symbol data 131 is converted into prediction symbol data II 131-2, which is then compressed, through the second encoding process, into three data units representing the higher-level symbol data 132. In the diagram for prediction symbol data II 131-2, "2 before" means that the data of that symbol is equal to the data of the symbol that is 2 symbols before it. With this process, three pixel cycles in the image data 110 are reduced to two symbol cycles in the prediction symbol data 131.

Figure 18A:
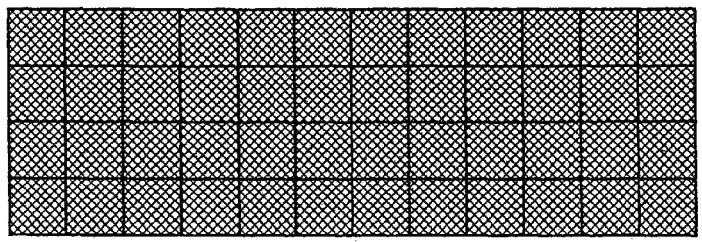
FIGS. 18A and 18B are diagrams to illustrate a systematic dither method.
Figure 18B:
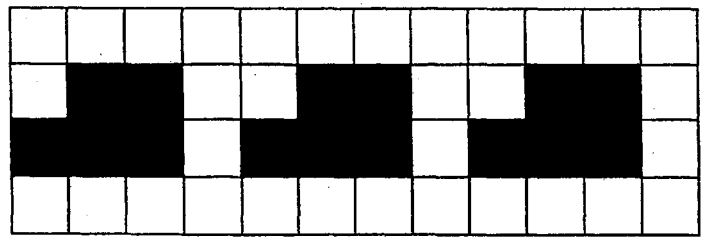

For a better understanding, comparison between the related art and the first embodiment is made concerning the conception of data just before encoding, paying attention to the second line in the diagrams of FIGS. 18 and 19. FIGS. 6A and 6B illustrate the comparison. FIG. 6A shows run length code data from the prediction condition data 130 in the related art. FIG. 6 B shows higher-level symbol data 132 in the first embodiment.

As shown here, the 5th to 9th symbols in the related art correspond to one symbol (5th symbol) in the higher-level symbol data 132.

According to the first embodiment, as discussed above, prediction symbol data 131 as a result of prediction processing is further subjected to prediction processing so that images with periodicity can be compressed efficiently without increasing the processing load.

Figure 7:
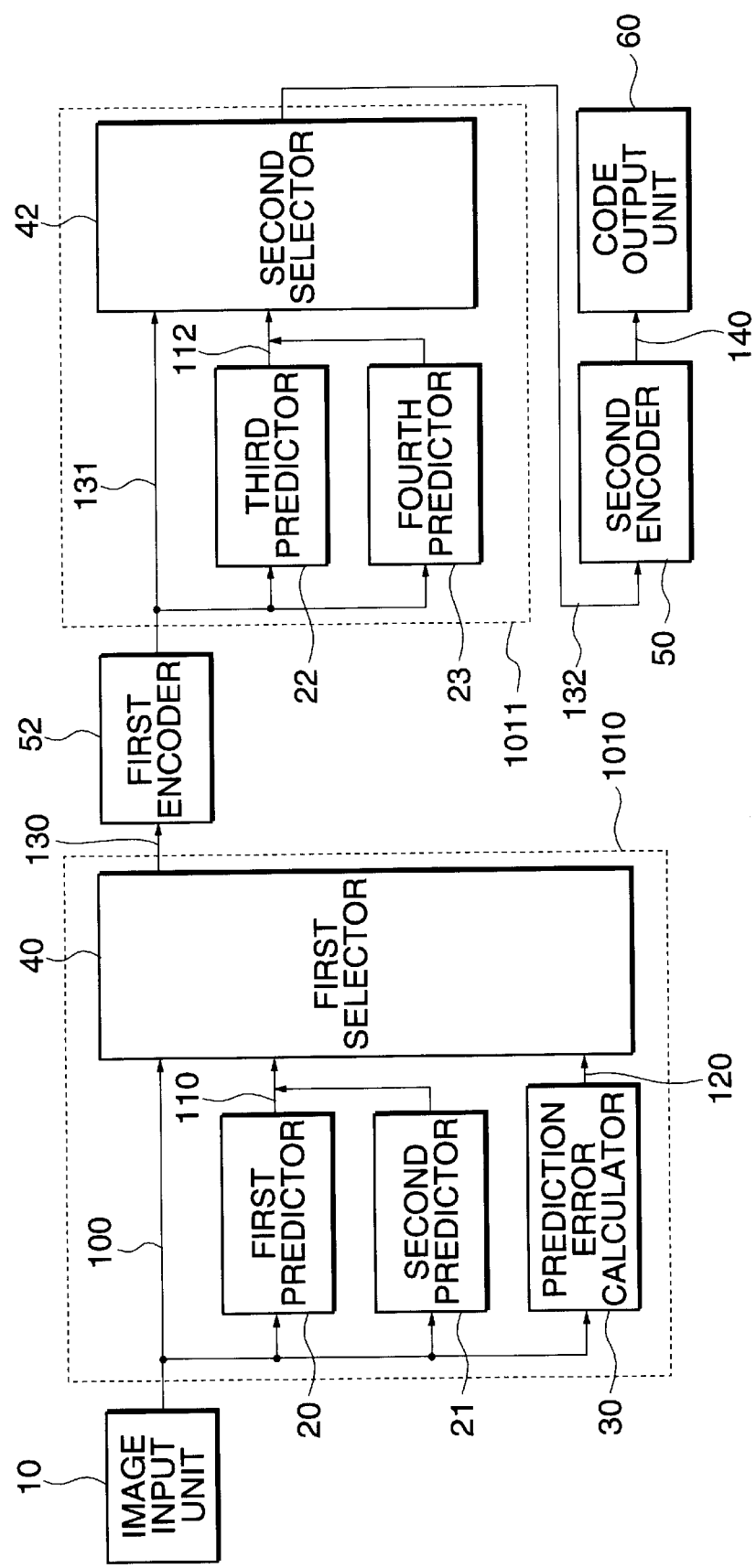
FIG. 7 shows the configuration of an image encoding system according to a second embodiment of the present invention.
Figure 8:
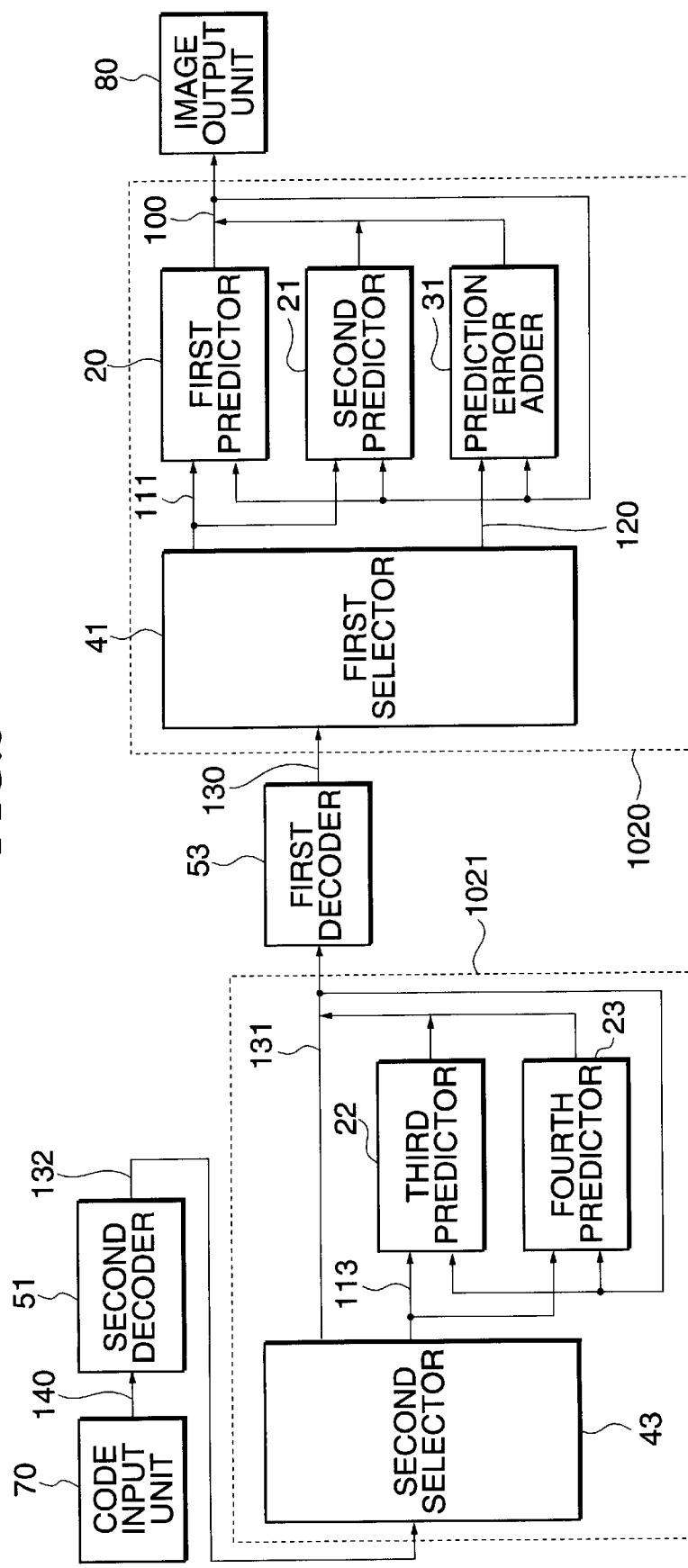
FIG. 8 shows the configuration of an image decoding system according to the second embodiment of the present invention.

Described next is a second embodiment of the present invention. FIGS. 7 and 8 show an image encoding system block diagram and an image decoding system block diagram, respectively. In these figures, the same elements as used in FIGS. 1, 2, 14 and 15 are marked with the same reference numerals and their descriptions are omitted here. 22 represents a third predictor, 23 a fourth predictor, 42 and 43 second selectors, 112 prediction data, and 113 control data.

The elements shown in FIG. 7 are described next. The third predictor 22 and the fourth predictor 23 each make a prediction for the prediction target symbol according to prediction symbol data 131 in a given manner and send the resulting data as prediction data 112 to the second selector 42. The second selector 42 detects whether the prediction for the prediction target symbol is right or wrong, according to the prediction symbol data 131 and the prediction data 112. As a result, if the prediction made by either predictor is right, the predictor's ID number is sent to the second encoder 50; if neither predictor has made the right prediction, the prediction symbol data 131 is converted into higher-level symbol data 132 and sent to the second encoder 50.

Next, the elements shown in FIG. 8 are explained, though descriptions of the same elements as used in the image encoding system shown in FIG. 7 are omitted here. It should be noted that in the image decoding system, the first, second, third and fourth predictors 20, 21, 22, 23 work in a way opposite to the encoding system.

If the higher-level symbol data 132 indicates a predictor ID number, the second selector 43 sends control data 113 to the predictor corresponding to that ID number, which in turn outputs prediction symbol data 131. On the other hand, if the higher-level symbol data 132 represents prediction symbol data, the second selector sends it as prediction symbol data 131 to the first decoder 53.

Figure 9:
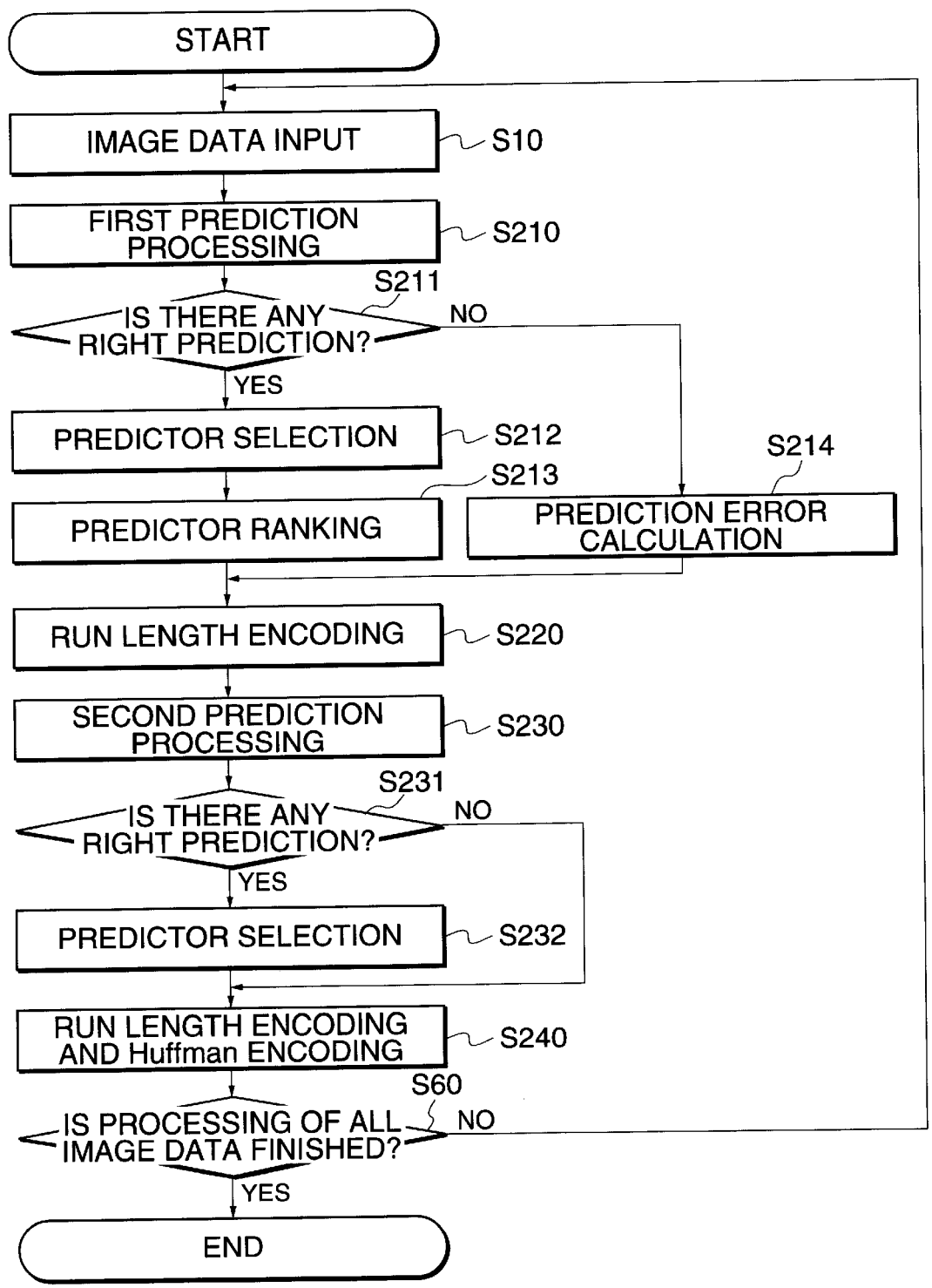
FIG. 9 is a flowchart showing an example of an operational sequence in an image encoding system according to the second embodiment of the present invention.
Figure 10:
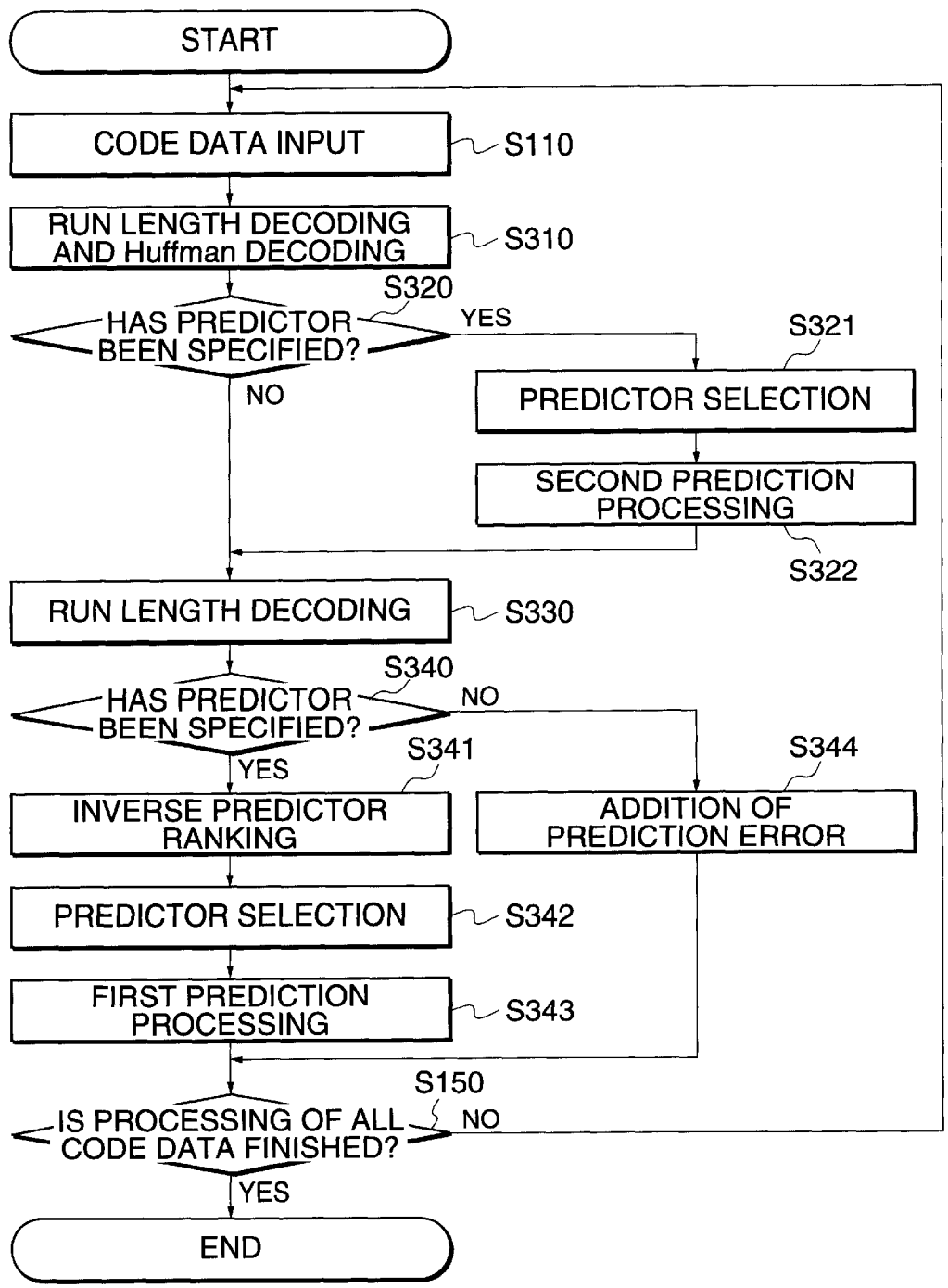
FIG. 10 is a flowchart showing an example of an operational sequence in an image decoding system according to the second embodiment of the present invention.

Based on the above-mentioned configuration, the operational sequence in the second embodiment is explained next. FIGS. 9 and 10 are a flowchart for the encoding sequence and one for the decoding sequence according to the second embodiment, respectively. The same elements as used in FIGS. 3, 4, 16 and 17 are marked with the same reference numerals and their descriptions are omitted here.

Referring to FIG. 9, the encoding steps in the second embodiment are described next. At step S210, the image data 100 is processed for the first prediction in the first predictor 20 and the second predictor 21.

At step S211, if any of the prediction data 110 matches the image data 100, the process goes to step S212; otherwise it goes to step S214. At step S212, the first selector 40 selects the predictor whose prediction data matches the image data 100. At step S213, the first selector 40 changes the ID number of the predictor selected at step S212 to ranking in predictor priority order, and treats it as prediction condition data 130.

At step S214, the prediction error calculator 30 calculates prediction error and treats the resulting data as prediction condition data 130. At step S220, the first encoder 52 processes the prediction condition data 130 for run length encoding. At step S230, the third predictor 22 and the fourth predictor 23 each process the prediction symbol data 131 for the second prediction in a predetermined manner.

At step S231, if any of the prediction data 112 matches the prediction symbol data 131 in the second selector 42, the process goes to step S232; otherwise it skips to step S240 where the prediction symbol data 131 is treated as higher-level symbol data 132.

At step S232, the second selector 42 selects the predictor whose prediction data matches the prediction symbol data 131 and the ID number of that predictor is treated as higher-level symbol data 132. At step S240, the second encoder 50 processes the higher-level symbol data 132 for run length encoding and Huffman encoding.

Next, the decoding sequence according to the second embodiment is explained, referring to FIG. 10. At step S310, the second decoder 51 decodes the code data 130 through the run length and Huffman decoding processes which are opposite to the run length encoding and Huffman encoding processes performed in the second encoder 50.

At step S320, if the higher-level symbol data specifies a predictor, the process goes to step S321; otherwise, it skips to step S330 where the higher-level symbol data 132 is treated as prediction symbol data 131. At step S321, the second selector 43 selects a predictor according to the prediction symbol data 131 and sends control data 113 to the selected predictor.

At step S322, the predictor which has received the control data 113 (either the third predictor 22 or the fourth predictor 23) processes it for the second prediction(inverse prediction processing) in a given manner and sends prediction symbol data 131. At step S330, the first decoder 53 decodes the prediction symbol data 131 through the run length decoding process which is opposite to the run length encoding process used in the first encoder 52, to obtain prediction condition data 130.

At step S340, if the prediction condition data 130 specifies a predictor, the process goes to step S341; if it indicates prediction error data, the process goes to step S344. At step S341, the first selector 41 processes the prediction condition data 130 through the inverse predictor ranking process which is opposite to the predictor ranking process used in the first selector 40.

At step 342, predictor selection is made according to the ranking data as a result of processing at step S341 and control data 111 is sent to the selected predictor. At step S343, the predictor which has received the control data 111 (either the first predictor 20 or the second predictor 21) processes it for the first prediction (inverse prediction processing) in a given manner and sends the resulting data as image data 100.

At step S344, the prediction error adder 31 calculates the pixel value of the target pixel from image data 100 before that pixel and the prediction error data 120, and sends the resulting data as image data 100.

For the convenience of illustration, the above explanation assumes that prediction error calculation at step S214 in the encoding sequence takes place after step S211. However, necessary data for processing can be obtained in advance; for example, it is also possible to configure a hardware system so that operation at step S214 can be performed concurrently while operation at step S210 is underway. Likewise, in the decoding sequence, operation at step S344 may be performed concurrently with operation at step S340.

Prediction error calculation at step S214 in the encoding sequence can be made, for example, using the following formula: (target pixel value)−(left pixel value). In this case, prediction error addition at step S344 in the decoding sequence can be made using the following formula: (left pixel value)+(prediction error). Here, it does not matter whether or not the prediction formula used for prediction error calculation is the same as the prediction formula used in the first predictor 20 or the second predictor 21.

Again, for the convenience of illustration, the above explanation assumes that the second encoder 50 is to perform two types of encoding processes. However, since the run length encoding process is intended for the run with the ID number of the third predictor 22 or the fourth predictor 23 which is included in the higher-level symbol data 132, this process may be independently performed in the second selector 42. This can omit unnecessary run length coding operation if predictions by both the third predictor 22 and the fourth predictor 23 are wrong.

Though the above explanation also assumes that the first encoder 52 and the first decoder 53 perform run length coding, and the second encoder 50 and the second decoder 51 perform run length coding and Huffman coding, algorithms which can be used here are not limited to these.

In addition, in the selection process by the second selector 42, if both the third predictor 22 and the fourth predictor 23 have made the right prediction, the same selection process as in the first selector 40 is performed. This means that they may be ranked in a specific order of priority or adaptively by a specific method. To determine the ranking, ID numbers may be converted into ranking data as in the first predictive converter 1010 in the related art. Also, predictor selection may be made according to the number of predictions made after the last match (right prediction) or the number of matches made.

Figure 11:
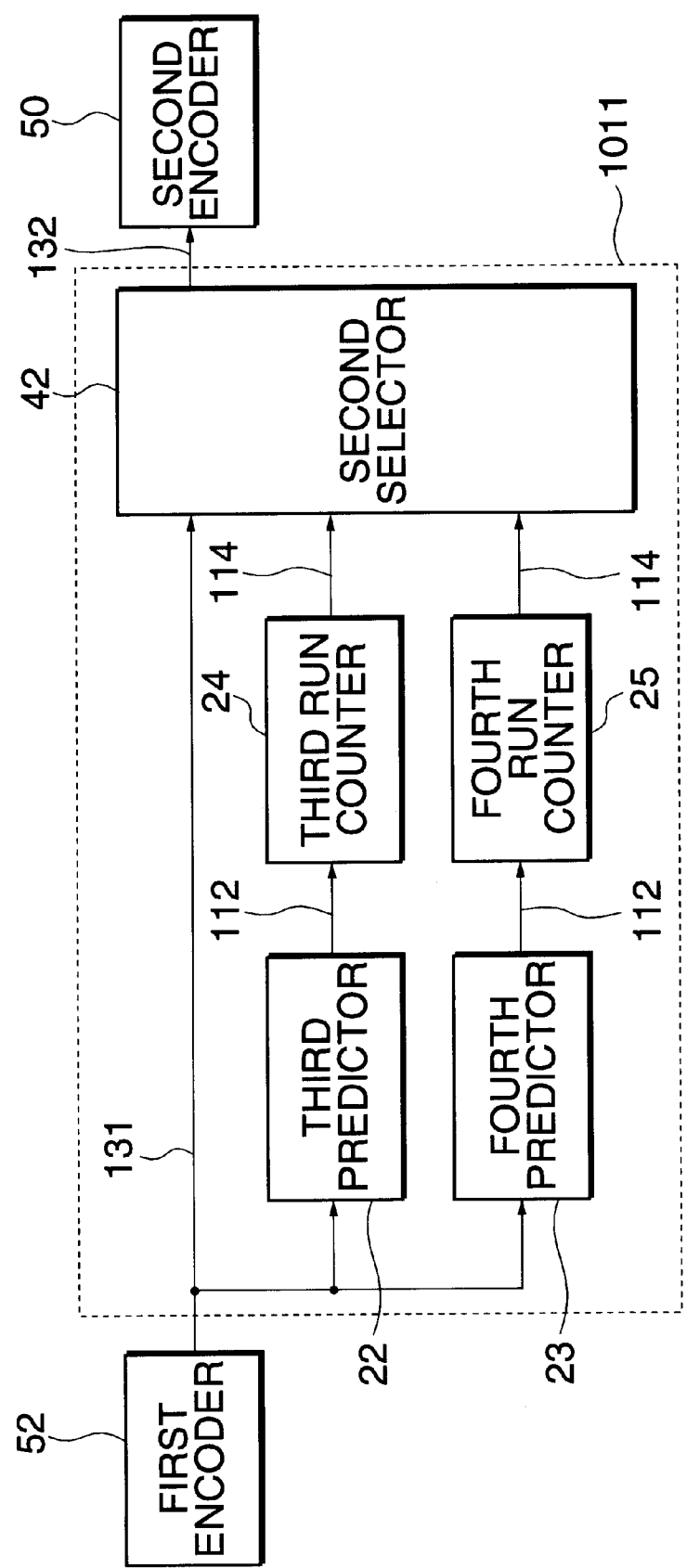
FIG. 11 shows a variation of image encoding system according to the second embodiment of the present invention.

In order to improve encoding efficiency in the second encoder 50, a predictor with a longer run may be selected. FIG. 11 is a block diagram of the second predictive converter 1011 for such a case.

In this figure, 24 represents a third run counter, 25 a fourth run counter, and 114 run length data. The third run counter 24 and the fourth run counter 25 count consecutive matches by the third predictor 22 and the fourth predictor 23, respectively and send the counts as run length data 114 to the second selector 42. The second selector 42 compares both run length data 114 and treats the ID number of the predictor which has the longer run data, as higher-level symbol data 132.

If both run length data are zeros, the prediction symbol data 131 is directly treated as higher-level symbol data 132.

If higher-level symbol data as a result of conversion of prediction symbol data would have a short run length, depending on the code structure, it may be better to use the prediction symbol data directly, or without conversion, from the viewpoint of compressibility. Therefore, conversion to higher-level symbol data may be selectively done taking the volume of code data into consideration.

In other words, comparison is made between the volumes of code data to be given in the second encoder 50 for prediction symbol data 131 and for higher-level symbol data 132 as a result of its conversion and the smaller data volume should be chosen.

This process may be simplified, for example, as follows: a threshold for higher-level symbol run length data is predetermined and it is made a rule to encode prediction symbol data as it is unless this threshold is exceeded.

In order to permit selective conversion to higher-level symbol data like this, some restriction on the second encoder 50 is necessary. In short, decodable code data should be used, whether information on a concerned part is expressed either by prediction symbols or higher-level symbols. Theoretically, this seems undesirable in terms of compressibility since two or more codes represent the same information. However, compressibility will improve actually because of the above-mentioned reason.

Next, FIGS. 12A, 12B and 12C show examples of Huffman code for ID number, run length and prediction error data, respectively. Here, there are separate code tables for predictor ID number, run length and prediction error data.

This means that even if ID numbers are different, codes for run length and prediction error are shared. For compressibility to be improved by fine adjustment, a single code tale may be used to allocate codes to all combinations of ID number and run length or prediction error data.

In the case of FIG. 12A, codes are separately allocated to prediction symbols and higher-level symbols so selectivity in conversion as mentioned above is ensured. Conversely, selectivity can be eliminated by adaptive processing such as allocating no code to the prediction symbol, if the higher-level symbol and prediction symbol represent the same information.

For simpler prediction processing in the second predictive converter 1011, it is desirable to divide prediction symbol data into units which can be easily processed in the implemented processing system. For instance, prediction symbols can be expressed on a per-byte or per-word basis. When the processing system is hardware based, any number of bits may be used but it is more preferable to represent all prediction symbols by the same bit length or a multiple of it.

In order to confirm the effect of the second embodiment, a simulation test was conducted. In the test, four methods were used for pixel prediction in the first predictive converter 1010 and eight methods were used to reference eight pixels before the target symbol for prediction symbol prediction in the second predictive converter 1011. The result of the test is shown in FIG. 13.

Figure 13:
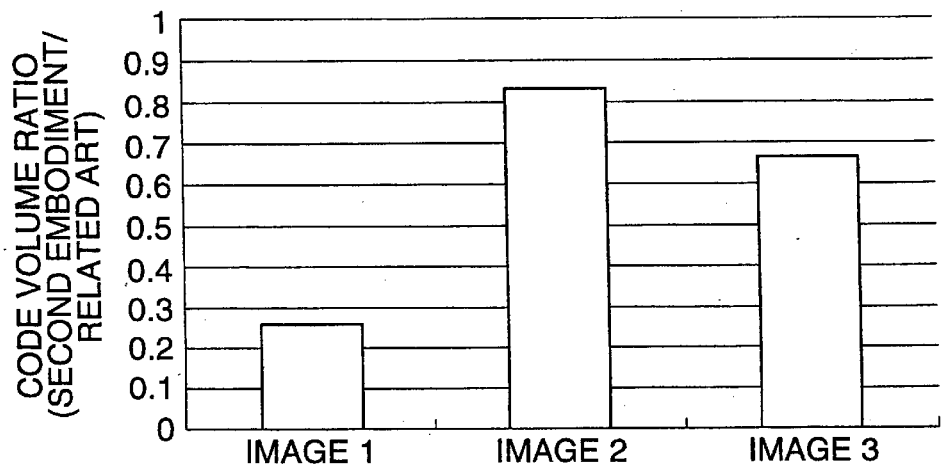
FIG. 13 illustrates the effect of an image encoding/decoding system according to the second embodiment of the present invention.

FIG. 13 indicates that the code data volumes for three different images 1 to 3 in the second embodiment are 25% to 85% of those in the related art and the effect of the invention is obvious. This illustrates that, according to the second embodiment, compressibility can be considerably improved even if image signals have periodicity.

As discussed so far, the present invention brings about the following effects: it is possible to encode even an input image with periodicity at high speed with high compression efficiency; and it is also possible to decode the data encoded in this way at high speed.

The entire disclosure of Japanese Patent Application No. 2000-70764 filed on Mar. 14, 2000 including specification, claims, drawings and abstract is incorporated herein by reference in its entirety.

What is claimed is:

1. An image encoding system comprising:
   an image input part which inputs an image signal;
   a first predictive converter which converts a relation between a pixel value of a target pixel in the image signal inputted through the image input part and that of another pixel in the image signal into a first prediction value;
   a first encoder which generates intermediate data by encoding the first prediction value output from the first predictive converter;
   a second predictive converter which converts a relation between a target symbol among symbols making up the intermediate data generated by the first encoder and another symbol into a second prediction value; and
   a second encoder which generates an encoded signal by encoding the second prediction value output from the second predictive converter.

2. The image encoding system according to claim 1, wherein the first predictive converter comprises:
   one or more predictors which generate one or more first prediction values;
   a prediction error calculator which calculates a difference between the first prediction value generated by one of the predictors and a pixel value of the target pixel to generate a prediction error; and
   a selector which selects the first prediction value if the first prediction value matches the pixel value of the target pixel, or selects the prediction error if they do not match, and outputs the selected first prediction value or prediction error to the first encoder.

3. The image encoder according to claim 2, wherein the first predictive converter outputs a prediction error based on the two-dimensional correlation of the image if no first prediction value matches the pixel value of the target pixel.

4. The image encoding system according to claim 2, wherein when the first predictive converter has multiple predictors, if first prediction values generated by two or more of the predictors match the pixel value of the target pixel, prediction selection is made according to any one of a fixed order of priority, the number of predictions after the last match, the number of matches and matching run length.

5. The image encoding system according to claim 1, wherein the second predictive converter comprises:
   one or more predictors which generate one or more second prediction values; and
   a selector which selects the second prediction value if the second prediction value generated by one of the predictors matches the intermediate data, or selects the intermediate data if they do not match, and outputs the selected second prediction value or intermediate data to the second encoder.

6. The image encoder according to claim 5, wherein the second predictive converter outputs the intermediate data without processing it, as a second prediction value, if no second prediction value matches the intermediate data.

7. The image encoding system according to claim 5, wherein when the second predictive converter has multiple predictors, if second prediction values generated by two or more of the predictors match the intermediate data, prediction selection is made taking into consideration a final code amount.

8. The image encoding system according to claim 5, wherein the second encoder first performs the same encoding operation as the first encoder on the second prediction value, output from the second predictive converter, matching the intermediate data, and then performs further encoding on the encoded second prediction value together with the intermediate data for non-matching second prediction value.

9. The image encoding system according to claim 1, wherein the first predictive converter references not only a target line in the image signal but also a processed line for prediction processing, taking into consideration a two-dimensional correlation of the image.

10. The image encoding system according to claim 1, wherein the second predictive converter performs prediction processing, taking into consideration a one-dimensional correlation of symbols making up the intermediate data.

11. The image encoding system according to claim 1, wherein the second predictive converter measures the run length of the second prediction value after prediction and performs no conversion if the measured run length is shorter than a predetermined threshold.

12. The image encoding system according to claim 1, wherein the first encoder expresses the intermediate data in terms of a unit used for processing in a processing system for encoding or in terms of a multiple of the unit.

13. The image encoding system according to claim 1, wherein encoding by the first encoder is fixed-run-length encoding.

14. The image encoding system according to claim 1, wherein code data having redundancy which can express information included in the intermediate data is prepared in encoding by the second encoder, regardless of whether or not the second predictive converter performs the conversion.

15. An image decoding system comprising:

a code input part which inputs an encoded signal, which is encoded by an image encoding system comprising: an image input part which inputs an image signal; a first predictive converter which converts a relation between the pixel value of a target pixel in the image signal inputted through the image input part and that of another pixel in the image signal into a first prediction value; a first encoder which generates intermediate data by encoding the first prediction value output from the first predictive converter; a second predictive converter which converts a relation between a target symbol among symbols making up the intermediate data generated by the first encoder and another symbol into a second prediction value; and a second encoder which generates an encoded signal by encoding the second prediction value output from the second predictive converter;

a second decoder which decodes the encoded signal inputted from the code input part to generate the second prediction value;

second inverse predictive converter which inversely converts the second prediction value generated by the second decoder to generate intermediate data;

a first decoder which decodes the intermediate data generated by the second inverse predictive converter to generate the first prediction value; and a first inverse predictive converter which inversely converts the first prediction value decoded by the first decoder to generate a pixel value of a target pixel.

16. The image decoding system according to claim 15, wherein the second inverse predictive converter comprises:

one or more inverse predictors which inversely predict one or more intermediate data pieces; and a second selector which selects one of the intermediate data pieces according to the second prediction value generated by the second decoder.

17. The image decoding system according to claim 15, wherein the first inverse predictive converter comprises:

one or more inverse predictors which inversely predict one or more pixel values for a target pixel;

a prediction error adder which calculates the pixel value from a prediction error obtained from the first prediction value; and a first selector which selects a pixel value inversely predicted by the inverse predictor based on the first prediction value, and the pixel value calculated by the prediction error adder.

18. An image encoding method comprising the steps of:

inputting an image signal;

converting a relation between a pixel value of a target pixel in the image signal and that of another pixel in the image signal into a first prediction value;

encoding the first prediction value to generate intermediate data;

converting a relation between a target symbol among symbols making up the intermediate data and another symbol into a second prediction value; and encoding the second prediction value to generate an encoded signal.

19. An image decoding method comprising the steps of:

inputting an encoded signal which is encoded by an image encoding system comprising: inputting an image signal; converting a relation between a pixel value of a target pixel in the image signal inputted through the image input part and that of another pixel in the image signal into a first prediction value; encoding the first prediction value to generate intermediate data; converting a relation between a target symbol among symbols making up the intermediate data and another symbol into a second prediction value: and encoding the second prediction value to generate an encoded signal;

decoding the encoded signal to generate the second prediction value;

inversely converting the second prediction value to generate intermediate data;

decoding the intermediate data to generate the first prediction value; and inversely converting the first prediction value to generate a pixel value of a target pixel.

* * * * *